No. 872,214. PATENTED NOV. 26, 1907.
F. M. BETHUNE.
HORSESHOE.
APPLICATION FILED MAY 23, 1907.
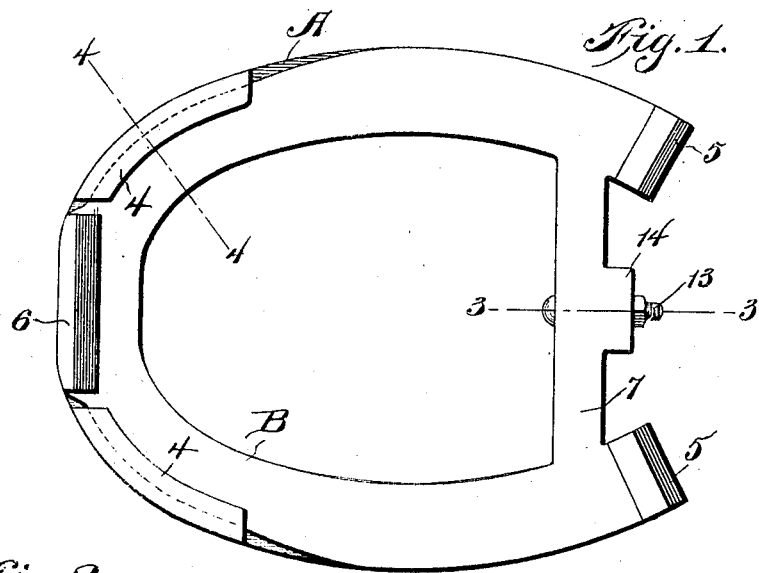
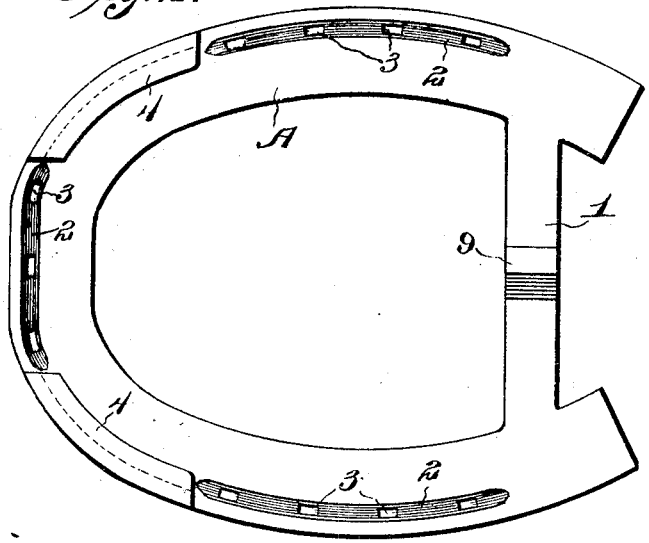
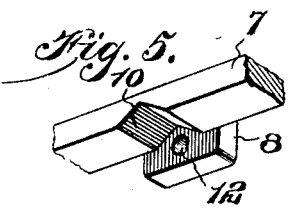
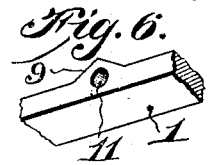
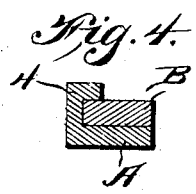
Witnesses
Louis R. Heinrichs
Wm. Bagger
Inventor
Frank M. Bethune
By Victor J. Evans
Attorney

UNITED STATES PATENT OFFICE.

FRANK MILLER BETHUNE, OF HOMESTEAD, PENNSYLVANIA.

HORSESHOE.

No. 872,214.　　　　Specification of Letters Patent.　　　　Patented Nov. 26, 1907.

Application filed May 23, 1907. Serial No. 375,342.

*To all whom it may concern:*

Be it known that I, FRANK MILLER BETHUNE, a citizen of the United States, residing at Homestead, in the county of Allegheny and State of Pennsylvania, have invented new and useful Improvements in Horseshoes, of which the following is a specification.

This invention relates to horseshoes, and it has particular reference to that class of horseshoes which are composed of a plate or body member, adapted to be permanently secured upon the hoof of the horse by means of nails, and a wear plate adapted to be detachably connected with the said hoof plate by connecting means such as an ordinary bolt, thus enabling the said wear plate to be readily detached and renewed as frequently as may be desired.

The present invention has for its object to simplify and improve the construction and operation of this class of horseshoes, and with these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a bottom plan view of a horseshoe constructed in accordance with the invention. Fig. 2 is a bottom plan view of the body plate of the shoe. Fig. 3 is a sectional detail view taken on the plane indicated by the line 3—3 in Fig. 1. Fig. 4 is a sectional detail view taken on the plane indicated by the line 4—4 in Fig. 1. Fig. 5 is a perspective detail view showing a portion of the wear plate. Fig. 6 is a perspective detail view showing a corresponding portion of the body plate.

Corresponding parts in the several figures are denoted by like characters of reference.

The improved device includes a body plate A and a wear plate B, each of the conventional horseshoe shape. The body plate A is provided near the heel thereof with a cross-bar 1; said body plate is also provided with grooves 2 and with apertures 3 for the passage of nails whereby it may be permanently supported upon the hoof of a horse. Said body plate is furthermore provided, upon its underside, adjacent to the toe, with undercut flanges 4—4.

The wear plate B is provided with heel calks 5 and with a toe calk 6 of conventional shape. Said wear plate, or the portions thereof adjacent to the toe calk, are adapted to be fitted in the undercut flanges 4—4, as will be best seen in Fig. 4 of the drawings; said wear plate being provided near the heel thereof with a cross-bar 7 corresponding with the cross-bar 1 of the body plate A, and having a lug 8 adapted to lie adjacent to the rear side of said cross-bar, when the wear plate is fitted in position. The cross-bar 1 of the body plate is provided intermediate its ends with a projection 9 adapted to engage a correspondingly shaped recess 10 in the cross-bar 7 of the wear plate. The cross-bar 1 of the body plate is provided with an aperture 11, and the lug 8 of the cross-bar 7 of the wear plate has a corresponding aperture 12 for the passage of a connecting bolt 13 having a tightening nut 14 by means of which the parts of the device may be securely connected.

The operation and advantages of this invention will be readily understood from the foregoing description taken in connection with the drawings hereto annexed. The body plates A are permanently secured upon the feet of the horse, and the wear plates are then attached upon and connected with the body plates by means of the connecting bolts. It is obvious that by this construction the wear plates may be detached and replaced very quickly and without annoyance to the animal, thus saving time and expense, and avoiding injury to the feet of the animal such as is frequently caused by the removal and replacement of shoes of ordinary construction. The wear plates may be made of any desired dimensions, thickness and weight, and the calks may be blunt or sharp, as may be desired. The projections 9 upon the cross-bar 1 of the body plate which engages the recess 10 in the cross-bar 7 of the wear plate will serve to prevent lateral movement of the shoe, and will greatly relieve strain upon the connecting bolt, thus preventing injury to the threads of the latter which might interfere with the convenient removal or replacement of said bolt.

Having thus fully described the invention, what is claimed as new is:

1. A horseshoe comprising a body plate having undercut flanges and provided with a cross-bar having a projection, in combination with a wear plate engaging the undercut flanges and having a recess corresponding with the projection of the cross-bar upon the body plate, and means for connecting the said cross-bars.

2. In a horseshoe, a body plate having undercut flanges and a cross-bar provided with a projection in combination with a wear plate having a correspondingly recessed cross-bar provided with a lug disposed adjacent to the cross-bar of the body plate, the latter and the lug being provided with registering apertures, and a connecting bolt engaging said apertures.

In testimony whereof, I affix my signature in presence of two witnesses.

FRANK MILLER BETHUNE.

Witnesses:
JOSEPH MORT,
THOMAS SHINTON.